Patented Dec. 18, 1928.

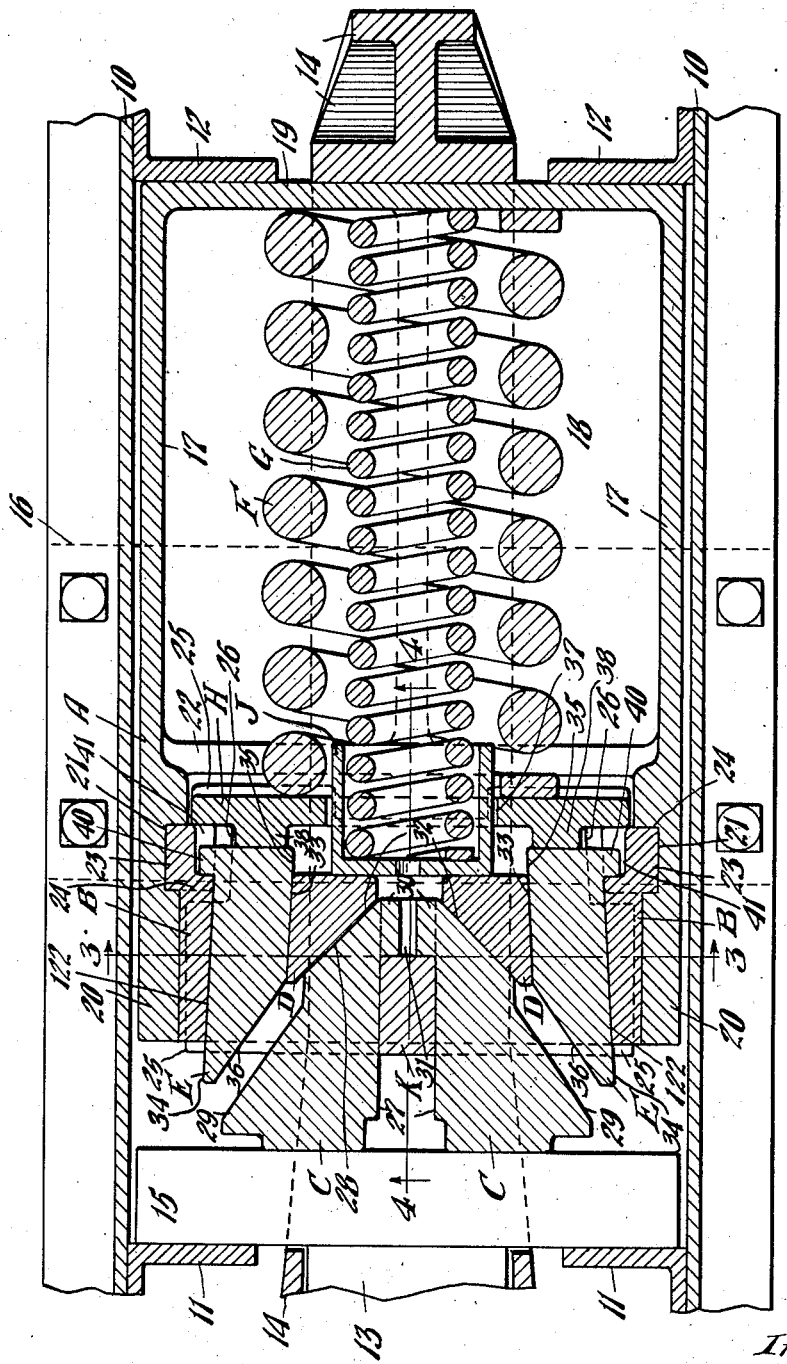

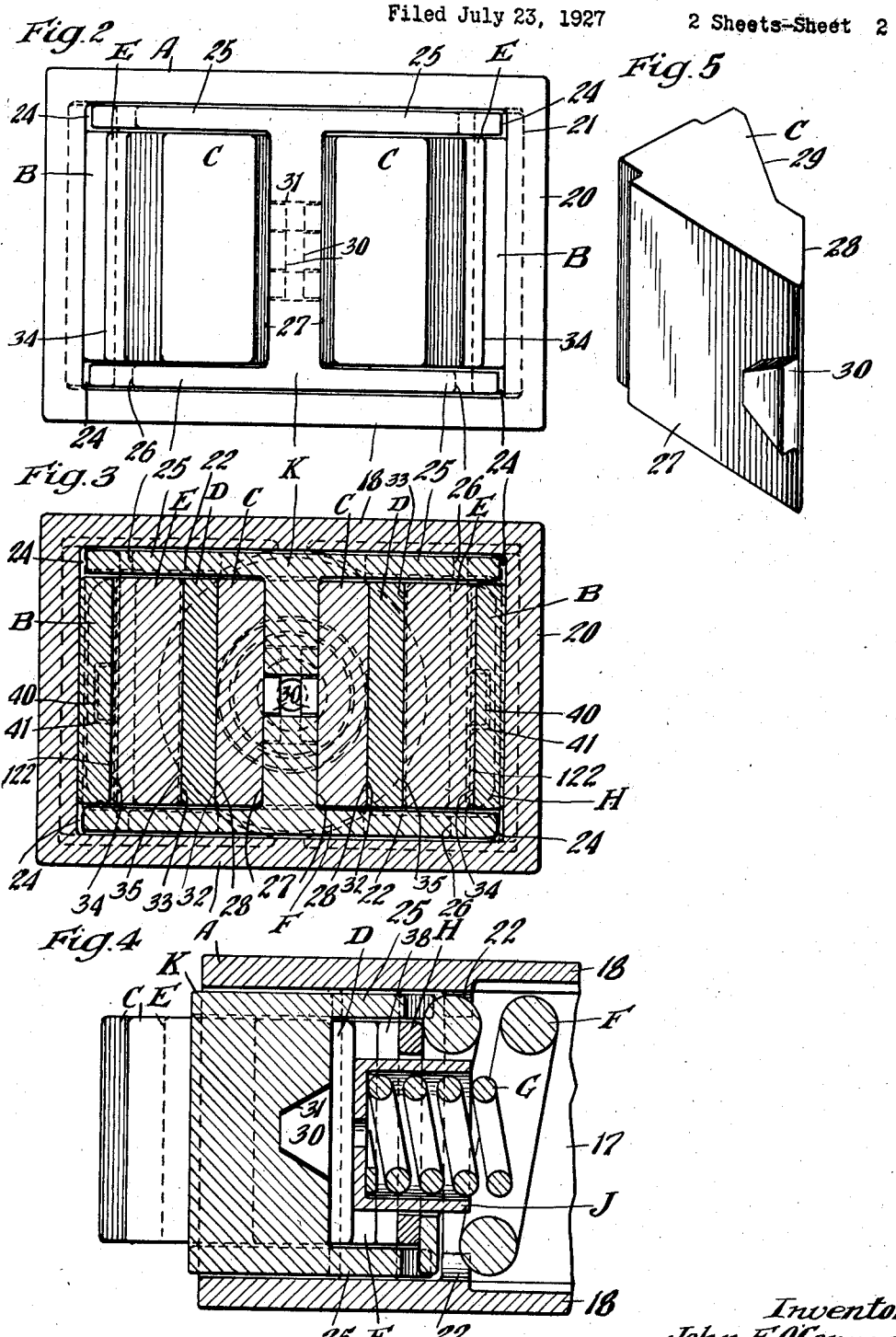

1,695,499

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 23, 1927. Serial No. 207,946.

This invention relates to improvements in friction shock absorbing mechanisms.

One object of the invention is to provide a friction shock absorbing mechanism, especially adapted for railway draft riggings having relatively light frictional resistance during the first part of the compression stroke, followed by heavier frictional resistance during the remainder of the compression stroke.

Another object of the invention is to provide a shock absorbing mechanism of the character specified including a friction casing and a central friction element with which pressure transmitting friction members cooperate, the pressure transmitting elements having wedging engagement with a plurality of friction shoes, certain of which have frictional engagement with the casing and wherein the friction shoes have cooperating friction surfaces also.

A still further object of the invention is to provide a shock absorbing mechanism as specified, including a friction casing, a central friction element and friction wedge means interposed between the central friction element and the walls of the casing, said friction means comprising a plurality of cooperating friction shoes, wherein the friction shoes are actuated in sequence to produce relatively light frictional resistance during the first part of the compression stroke followed by heavier frictional resistance during the remainder of the compression stroke.

Other objects of the invention will more clearly appear from the description and claims hereinafter following.

In the drawings, forming a part of this specification, Figure 1 is a longitudinal, horizontal sectional view of a railway draft rigging showing my improvements in connection therewith. Figure 2 is a front end elevational view of the shock absorbing mechanism proper. Figure 3 is a vertical, transverse, sectional view corresponding substantially to the line 3—3 of Fig. 1. Figure 4 is a longitudinal, vertical, sectional view of the front end portion only of the shock absorbing mechanism illustrated in Figure 1, the section corresponding substantially to the line 4—4 of Figure 1. And Figure 5 is a detail perspective view of one of the pressure transmitting elements employed in connection with my improved mechanism.

In said drawings, 10—10 indicate channel shaped center or draft sills of a railway car underframe having the usual front stop lugs 11—11 and rear stop lugs 12—12 secured to the inner sides thereof. The inner end portion of the draw bar is designated by 13 to which is operatively connected a yoke 14 of well known form. The shock absorbing mechanism proper, as well as the front main follower 15 are disposed within the yoke 14 and the yoke in turn is supported by a detachable saddle plate 16 secured to the draft sills.

My improved shock absorbing mechanism proper, as shown, comprises broadly, a combined friction shell and spring cage A provided with liners B—B; two wedge blocks C—C; two inner friction shoes D—D; two outer friction shoes E—E; a relatively heavy spring resistance element F; a lighter spring resistance element G; a pair of spring followers H and J; and a central friction post K.

The combined friction shell and spring cage A is in the form of a substantially rectangular box-like casing having longitudinally disposed spaced side walls 17—17, horizontally disposed spaced top and bottom walls 18—18 and a transverse vertical rear end wall 19. The end wall 19 cooperates with the stop lugs 12 in the manner of the usual rear follower. The front end portions of the side walls 17 are inwardly thickened as indicated at 20, the thickened sections 20 being vertically slotted inwardly of the front end of the casing to provide seats 21 adapted to cooperate with the liners to anchor the same to the casing. The top and bottom walls of the casing have transversely extending ribs 22 on the inner sides thereof, the ribs 22 cooperating with means for limiting the inward movement of the friction post K, as hereinafter more clearly pointed out.

The liners B which are detachably mounted on the side walls 17 of the casing A are of similar design, each being in the form of a relatively heavy rectangular plate. The liners B have longitudinally disposed flat friction surfaces 122 on the inner sides thereof, the surfaces 122 preferably converging inwardly of the mechanism. At the rear end, each liner has a vertically disposed relatively broad rib 23 on the outer side thereof, the rib 23 snugly fitting the corresponding seat 21 in one of the side walls 17 in the casing A. It will be evident that with the ribs 23 of the liners B seated in the seats 21, the liners are anchored against longitudinal movement with respect to the casing. As most clearly shown in Figures 2 and 3, the liners B are cut away at the top and bottom sides for an appreciable distance, thereby leaving lugs 24 at the rear ends thereof adapted to cooperate with means for retaining the friction post assembled with the casing as hereinafter explained.

The friction post K comprises a central, heavy, vertically disposed plate-like section provided with top and bottom plate-like wings 25—25. The wings 25 extend substantially for the entire width of the casing A and are provided with recesses or notches 26 at the rear ends thereof, each notch 26 being adapted to receive one of the lugs 24 of the liners B. The notches 26 are of such a size that a certain amount of longitudinal motion is permitted between the wings 25 and the liners B, thus providing for a certain amount of inward movement of the post K during the initial portion of the compression of the mechanism. It will also be noted that a clearance is provided between the inner walls of the notches 26 and the lugs 24. This clearance is provided to facilitate assembling of the mechanism. The inner end edges of the wings 25 are normally slightly spaced from the ribs 22 on the top and bottom walls of the casing to permit of the limited movement of the post K hereinbefore referred to. When the clearance between the inner ends of the wings 25 and the ribs 22 has been taken up, the ribs 22 positively limit the movement of the post and hold the same stationary during the last operation of the compression stroke of the mechanism.

The wedge blocks C are of similar design, each having a flat front end face bearing directly on the inner side of the main follower 15. Each block C is provided with a longitudinally disposed flat friction surface 27 on the inner side thereof adapted to cooperate with the friction post K. On the outer side, each wedge block C is provided with a pair of spaced wedge faces, the innermost wedge face thereof being designated by 28 and the outermost face being designated by 29. As most clearly shown in Figure 1, the wedge face 28 is disposed at a blunter angle with respect to the longitudinal axis of the mechanism than the wedge face 29. At the extreme rear end each block C is provided with a substantially triangular laterally inwardly projecting lug 30 which cooperates with a similarly shaped pocket 31 provided at the same side of the friction post K. As will be clear upon reference to Figures 1, 4 and 5, the lugs 30 permit free inward movement of the wedge block C but positively limiting outward movement thereof by engagement with the walls of the pockets 31 of the post K.

The friction shoes D are of similar design. The shoes D as shown in Figure 1 are disposed at opposite sides of the wedge blocks C and have front wedge faces 32 cooperating with the wedge faces 28 of the blocks C. On the outer sides the shoes D are provided with flat friction surfaces 33 which cooperate with the shoes E. The inner ends of the shoes D present flat transverse abutment faces which cooperate with the spring follower J.

The friction shoes E, which are two in number, are of similar design and are interposed between the shoes D and the liners B. Each shoe E has a longitudinally disposed flat outer friction surface 34 adapted to cooperate with the friction surface 122 of the corresponding liner B. On the inner side each shoe E presents a longitudinally disposed flat friction surface 35 cooperating with the friction surface 33 of the shoe D at the corresponding side of the mechanism. Each friction shoe E has a wedge face 36 at the forward end thereof adapted to cooperate with the wedge face 29 of the wedge block at the same side of the mechanism, the wedge face 36 being correspondingly inclined to the wedge face 29. As most clearly shown in Figure 1, the wedge faces 36 of the shoes E are normally spaced from the wedge faces 29 of the wedge block C, the shoes E being normally disposed in spaced relation with respect to the wedge block C when the mechanism is in the full release position.

The spring resistance means of my improved shock absorbing mechanism comprises the light inner coil G and the heavier outermost coil F. Both of the coils of the spring resistance means have their rear ends bearing directly on the end wall 19 of the casing. The forward end of the outer coil F bears on the inner side of the spring follower H, which is interposed between this coil and the friction shoes E. The spring follower H is in the form of a rectangular plate having the main body portion thereof provided with a central opening 37 adapted to loosely receive the spring follower J. At the forward side, the spring follower H is also provided with forwardly projecting relatively heavy ribs 38, which bear directly on the inner ends of the friction shoes E. The inner coil of the spring resistance has the forward end thereof seated within the spring follower J, which is in the form of a hollow cap. The front end portion of the spring follower cap J bears directly on the inner ends of the friction shoes D.

The entire friction system including the wedges C—C, the shoes D—D and the shoes E—E is disposed between the top and bottom wings 25 of the friction post K, the wings 25 of the post thus serving as wear plates to protect the top and bottom walls of the casing A.

In assembling my improved shock absorbing mechanism, the main springs F and G together with the spring followers H and J are first inserted into the casing A. The friction system of the mechanism is then assembled by placing the wedge blocks C, the shoes D and the shoes E in position between the top and bottom wings 25 of the post K and also placing the liners B in contact with the outer friction shoes E. With the parts thus assembled as a unit, the same are laterally compressed to a slight extent until the ribs 23 will freely pass the side walls of the casing. The assembled unit is then inserted within the casing and the ribs 23 of the liners B brought into alignment with the seats 21 of the side walls 17 of the casing A. With the parts in this position, the friction unit is permitted to expand, thereby seating the ribs 23 in the seats 21 and anchoring the liners to the casing A to hold the same against longitudinal movement with respect to the casing.

When the parts of the mechanism are assembled, the spring resistance elements F and G are placed under initial compression. Inasmuch as the central spring resistance G is placed under initial compression, the tendency of the same to expand will compensate for wear of the various friction and wedge faces by holding the friction shoes D in intimate contact with the wedge faces of the block C at all times. It is further pointed out that, due to the expansive action of the spring resistance G, the friction shoes D are wedged outwardly thereby forcing the shoes E outwardly also laterally of the mechanism and pressing the liners B against the side walls of the casing A, thereby maintaining the ribs 23 of the liners seated within the seats 21.

The operation of my improved shock absorbing mechanism assuming a compression stroke is as follows: The main follower 15 and the casing A will be moved relatively toward each other, thereby forcing the wedge blocks C inwardly of the casing against the spring resisted friction shoes D. A wedging action will thus be set up between the wedges C and the shoes D forcing the friction shoes D into intimate contact with the friction shoes E and pressing the latter against the friction surfaces of the liners B. Due to this wedging action, the wedges C will also be forced into tight frictional contact with the post K. On account of the friction existing between the post K and the wedges C, the post K will be carried inwardly with the wedges C during the first part of the compression stroke. The movement of the post K inwardly in unison with the wedge blocks C will continue until movement of the post K is arrested by engagement of the wings 25 thereof with the abutment ribs 22 of the casing A. Upon movement of the post K being arrested, the wedge blocks C will be forced to slide on the post during the remainder of the compression stroke of the mechanism. As the wedge blocks slide inwardly on the post K, the friction shoes D will be forced inwardly on the friction surfaces of the shoes E opposed by the spring resistance G. During this time the outer shoes E will be held substantially stationary by the expansive action of the relatively heavy spring resistance F. The inward movement of the shoes D with respect to the shoes E will continue until the relatively keen faces 29 of the wedge blocks C come into engagement with the keen wedge faces 36 of the friction shoes E. Upon engagement of the wedges C with the shoes E, the latter will be forced inwardly of the mechanism and spread apart due to the wedging action between the wedge faces. Inasmuch as the cooperating wedge faces of the shoes E and the wedge block C are keener than the cooperating wedge faces of the shoes D and the wedge blocks C, a heavier spreading action will be produced during the last part of the compression stroke of the mechanism, thereby greatly increasing the capacity of the gear during this portion of the operation. The compression stroke as described will continue until the actuating force is reduced or inward movement of the follower 15 is limited by engagement with the front end of the casing A. Upon engagement of the casing A by the follower 15, the force will be transmitted directly through the casing to the stop lugs of the draft sills, the casing serving as a solid column member to transmit the load and prevent the main springs from being unduly compressed. During release of the mechanism, upon reduction of the actuating force, the expansive action of the springs F and G will force the friction shoes D and E outwardly. Inasmuch as the friction post is forced inwardly during the early part of the compression stroke sufficient clearance is provided between the lugs 24 and the walls of the recesses 26 of the wings 25 to allow a preliminary movement of the post K with respect to the casing A during initial release, thereby greatly facilitating the releasing action.

As the shoes D and E are forced outwardly, the friction post K will be carried therewith until movement of the same is limited by the lugs 24 on the liners B cooperating with the wings 25, as hereinbefore pointed out. After the post has been arrested, the friction shoes D and E will continue to move outwardly carrying the wedge blocks C therewith. Movement of the outer friction shoes E is finally stopped upon the main body portion of the spring follower H coming in engagement with the inner ends of the liners B. In order to prevent any tendency of the friction shoes E from being carried outwardly beyond the position shown in Figure 1 by frictional contact with the shoes D, I preferably provide the shoes E with laterally outwardly extending lugs 40 cooperating with and engaging within notches 41 in the liners B. The cooperating lugs 40 and the notches 41 are of substantially the same design as the similar cooperating lugs 30 and notches or pockets 31 of the blocks C and post K. The friction shoes D will be forced outwardly relatively to the shoes E until movement of the wedge block C is limited by the lugs 30 thereof which engage the post K.

While I have herein shown and described the preferred manner of carrying out my invention, the same is merely illustrative, and I contemplate all changes and modifications which come within the scope of the claims apended hereto.

I claim:

1. In a friction shock absorbing mechanism, the combination with a combined friction shell and spring cage; of a central friction element; a pair of wedge pressure transmitting members movable relatively to the central element and having frictional engagement with said central friction element; a plurality of friction shoes cooperating with said wedge pressure transmitting members, said shoes having sliding frictional contact with each other, certain of said shoes having frictional engagement with the shell; and spring resistance means opposing inward movement of the shoes.

2. In a friction shock absorbing mechanism, the combination with a friction shell; of a central friction element; a pair of pressure transmitting wedge members having sliding movement on said central friction element; friction shoes having frictional contact with the shell; additional friction shoes slidable on said first named shoes, all of said shoes having wedge faces adapted to cooperate with said wedge pressure transmitting members, said shoes being engaged successively by said wedge pressure transmitting members; and spring resistance means opposing inward movement of the shoes.

3. In a friction shock absorbing mechanism, the combination with a friction shell having longitudinally disposed friction surfaces; of inner and outer friction shoes having cooperating friction surfaces, said outer shoes cooperating with said shell friction surfaces, each of said shoes having a wedge face; wedge pressure transmitting means having the wedge faces thereof in constant engagement with the cooperating wedge faces of certain of said shoes and the remaining shoes having the wedge faces thereof normally spaced from the cooperating faces of said means and adapted to be engaged by said cooperating wedge faces of the wedge means after a predetermined compression of the mechanism to effect successive cooperation of said shoes; a central friction element relatively to which said means is movable, said central element and means having cooperating friction surfaces; and spring resistance means opposing relative movement of all of said shoes with respect to the friction shell.

4. In a friction shock absorbing mechanism, the combination with a friction shell having longitudinally disposed friction surfaces; a central friction member; pressure transmitting spreading elements having frictional engagement with said friction element and movable relatively thereto; outer friction shoes having frictional engagement with the shell friction surfaces; inner friction shoes having frictional contact with said outer shoes, said pressure transmitting spreading elements engaging said inner shoes during the entire compression stroke of the mechanism and cooperating with said outer shoes after a predetermined compression of the mechanism to produce graduated increasing frictional resistance during the compression stroke of the mechanism; and means yielding opposing movement of said outer and inner shoes with respect to the shell.

5. In a friction shock absorbing mechanism, the combination with a friction shell having longitudinally disposed friction surfaces; of a central friction member; wedge members movable relatively to said friction member and having frictional engagement therewith, said wedge members each having a plurality of wedge faces, said wedge faces of each wedge member being disposed at an angle to each other; inner and outer friction shoes having cooperating friction surfaces, said outer shoes having frictional engagement with the shell friction surfaces, each shoe having a wedge face cooperating with one of the wedge faces of said wedge members, the cooperating wedge faces of said outer shoes and wedge members being normally spaced apart; and spring resistance means opposing inward movement of said inner and outer shoes.

6. In a friction shock absorbing mechanism, the combination with a friction shell having opposed interior friction surfaces; of a central friction post; pressure transmitting members relatively movable with respect to the post and having frictional engagement therewith, each of said pressure transmitting members having a keen wedge face and a blunt wedge face; two sets of friction shoes, the friction shoes of each set having cooperating friction surfaces and one of the shoes of each set having engagement with said shell friction surfaces, one of the shoes of each set having keen wedge faces adapted to cooperate with the keen face of one of said pressure transmitting members and the other shoe of each set having a blunt wedge face cooperating with the blunt wedge face of said last named pressure transmitting member; and means yieldingly opposing inward movement of said sets of shoes.

7. In a friction shock absorbing mechanism, the combination with a casing having interior friction surfaces; of a main spring resistance; an additional spring resistance; a plurality of relatively movable cooperating friction elements, certain of which engage with the friction surfaces of said casing and are movable longitudinally thereof and resisted in their movement by said main spring resistance, movement of the remaining elements being resisted by said additional spring resistance during the entire compression stroke of the mechanism, said additional spring resistance also opposing relative movement of said friction elements; a central friction element; a wedge pressure transmitting means cooperating with said central friction element and relatively movable thereto, said wedge pressure transmitting means cooperating with each of said relatively movable friction elements during the compression stroke of the mechanism.

8. In a friction shock absorbing mechanism, the combination with a friction shell; of a central friction posts; a plurality of cooperating relatively movable friction elements, certain of which have engagement with said shell and are relatively movable thereto; pressure transmitting means having frictional engagement with the post and wedge faces cooperating with said last named elements and also having additional wedge faces continuously cooperable with the remaining elements, all of said wedge faces being operative during the compression stroke of the mechanism; a main spring resistance opposing relative movement of the friction shell and the elements having engagement therewith; and an additional spring resistance opposing relative movement of the shell and of the elements continuously engaging the wedge independently of said first named spring resistance.

9. In a friction shock absorbing mechanism, the combination with a friction shell; of a plurality of cooperating relatively movable friction elements, certain of which have engagement with said shell and are relatively movable thereto; a central friction post; pressure transmitting means relatively movable to the post and having frictional contact therewith, said pressure transmitting means having wedge faces cooperating with said last named elements and also having additional wedge faces cooperating with the remaining elements, said first named wedge faces being normally disengaged from the cooperating elements to permit relative movement of said cooperating elements, and provide for preliminary action during the compression stroke of the mechanism; a spring resistance opposing relative movement of said friction shell and elements having engagement therewith; and an independent spring resistance opposing movement of the remaining friction elements during the entire compression stroke of the mechanism.

10. In a friction shock absorbing mechanism, the combination with a friction shell; of a central friction post; a friction wedge system cooperating with said shell and post, said system including a plurality of friction shoes having limited relative movement and spreading means for cooperating with the shoes, said spreading means and each of said shoes having cooperating sets of wedge faces, the wedge faces of one set being angularly disposed with respect to the wedge faces of the other set; pressure transmitting means; spring resistance elements cooperating with said pressure transmitting means, one of said elements resisting inward movement of certain of said shoes and the other spring resistance element opposing inward movement of the remaining shoes during the entire compression stroke of the mechanism, said pressure transmitting element directly cooperating with said last named shoes.

11. In a friction shock absorbing mechanism, the combination with a friction shell having a plurality of friction surfaces and spring abutment means thereon; of two sets of friction shoes, said sets having cooperating friction surfaces and being relatively movable with reference to each other, one of said sets having frictional engagement with the friction surfaces of the shell; a main spring resistance interposed between said abutment means and said last named set of shoes; a second spring resistance interposed between said abutment means and the other set of shoes; a central friction post; and a pair of wedge members having frictional engagement with the post and being relatively movable thereto, said wedge members having a plurality of wedge faces cooperating with the two sets of shoes, the cooperating wedge faces of said wedge and shoes which engage the friction shell being normally separated to permit limited relative movement of said two sets of shoes during preliminary action of the mechanism.

In witness that I claim the foregoing I have hereunto subscribed my name this 20th day of July, 1927.

JOHN F. O'CONNOR.